United States Patent [19]

Farinacci et al.

[11] Patent Number: 5,519,704
[45] Date of Patent: May 21, 1996

[54] RELIABLE TRANSPORT PROTOCOL FOR INTERNETWORK ROUTING

[75] Inventors: Dino Farinacci, San Jose, Calif.; Robert Albrightson, Grantham, N.H.

[73] Assignee: Cisco Systems, Inc., San Jose, Calif.

[21] Appl. No.: 231,619

[22] Filed: Apr. 21, 1994

[51] Int. Cl.⁶ ............................................. H04J 3/02
[52] U.S. Cl. ...................... 370/85.13; 370/60; 370/94.1
[58] Field of Search ............................ 370/85.13, 60, 370/94.1, 85.3, 85.5, 85.6, 32, 60.1

[56] References Cited

U.S. PATENT DOCUMENTS

| | | | |
|---|---|---|---|
| 4,131,767 | 12/1978 | Weinstein et al. | 179/170.2 |
| 4,161,719 | 7/1979 | Parikh et al. | 340/147 SY |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |
| 4,499,576 | 2/1985 | Fraser | 370/60 |
| 4,507,760 | 3/1985 | Fraser | 365/221 |
| 4,532,626 | 7/1985 | Flores et al. | 370/85 |
| 4,763,191 | 8/1988 | Gordon et al. | 358/86 |
| 4,893,306 | 1/1990 | Chao et al. | 370/94.2 |
| 4,933,937 | 6/1990 | Konihi | 370/85.13 |
| 5,003,595 | 3/1991 | Collins et al. | 380/25 |
| 5,033,076 | 7/1991 | Jones et al. | 379/67 |
| 5,136,580 | 8/1992 | Videlock et al. | 370/60 |
| 5,199,049 | 3/1993 | Wilson | 375/104 |
| 5,212,686 | 5/1993 | Joy et al. | 370/60 |
| 5,226,120 | 7/1993 | Brown et al. | 395/200 |
| 5,229,994 | 7/1993 | Balzano et al. | 370/85.13 |
| 5,237,564 | 8/1993 | Lespagnol et al. | 370/60.1 |
| 5,249,178 | 9/1993 | Kurano et al. | 370/60 |
| 5,260,933 | 11/1993 | Rouse | 370/94.1 |
| 5,260,978 | 11/1993 | Fleischer et al. | 375/106 |
| 5,271,004 | 12/1993 | Proctor et al. | 370/60 |
| 5,283,783 | 2/1994 | Nguyen et al. | 370/16.1 |
| 5,291,482 | 3/1994 | McHarg et al. | 370/60 |

(List continued on next page.)

FOREIGN PATENT DOCUMENTS

| | | | |
|---|---|---|---|
| WO93/07692 | 4/1993 | WIPO | H04J 3/24 |
| WO93/07569 | 4/1993 | WIPO | G06F 13/40 |
| WO9401828 | 1/1994 | WIPO | 15/40 |

OTHER PUBLICATIONS

Pei, T.–B. & C. Zukowski, "Putting Routing Tables in Silicon", IEEE Netwrok Magazine (Jan. 1992), p. 42.

Tsuchiya, P. F., "A Search Algorithm for Table Entries with Non–Contiguous Wildcarding".

Primary Examiner—Douglas W. Olms
Assistant Examiner—Shick Hom
Attorney, Agent, or Firm—D'Alessandro & Ritchie

[57] ABSTRACT

A reliable transport protocol, suitable for routing protocols, that works with unicast transmission and multicast transmission, and an improved routing protocol based thereon. Multicast transmissions can be interspersed with unicast transmissions in situations where some of the receivers have received all of the packets sent to them and others have not. A mechanism to deliver multicast packets quickly to some receivers, even when there are unacknowledged packets pending for other receivers. When a packet is multicast from a sender node to all of its neighbors, the sender puts the packet on a queue for each neighbor and retransmits the packet if an acknowledgement has not been received within a predetermined period of time. If the packet is retransmitted, it is transmitted as a unicast. The invention takes advantage of the fact that the sender already has to maintain state information to determine who has not received its packets. A technique for distributing routing information gathered by a router outside an autonomous system of routers using the same routing protocol. A metric calculated by an identical routing protocol or a different routing protocol may be distributed and used by routers in a different autonomous system. Packets may be labeled with authentication information or with an administrative tag that specifies a method of routing in response to policy considerations.

41 Claims, 13 Drawing Sheets

U.S. PATENT DOCUMENTS

| | | | |
|---|---|---|---|
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,319,644 | 6/1994 | Liang | 370/85.5 |
| 5,331,637 | 7/1994 | Francis et al. | 370/60 |
| 5,361,250 | 11/1994 | Truonh et al. | 370/16.1 |
| 5,361,256 | 11/1994 | Doeringer et al. | 370/94.1 |
| 5,390,170 | 2/1995 | Sawant et al. | 370/58.1 |
| 5,394,394 | 2/1995 | Crowther et al. | 370/60 |
| 5,400,325 | 3/1995 | Chatwani et al. | 370/60.1 |
| 5,408,469 | 4/1995 | Opher et al. | 370/60.1 |

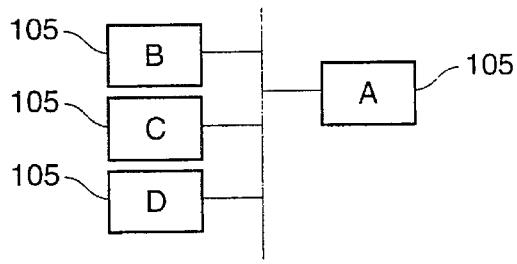

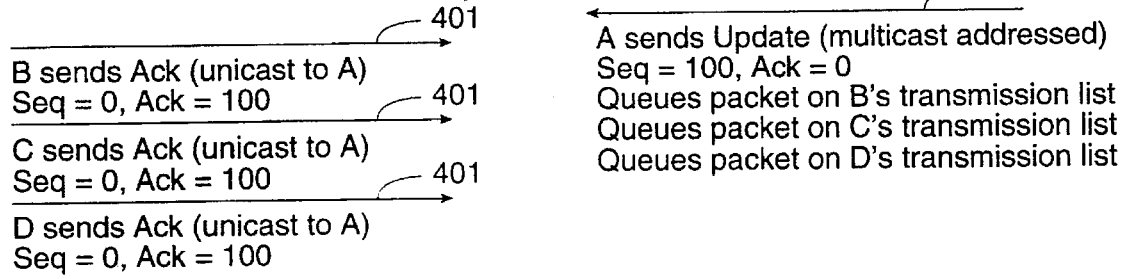

An Update Exchange — 402

401 →

A sends Update (multicast addressed)
Seq = 100, Ack = 0
Queues packet on B's transmission list
Queues packet on C's transmission list
Queues packet on D's transmission list B sends Ack (unicast to A)
Seq = 0, Ack = 100 — 401 →

C sends Ack (unicast to A)
Seq = 0, Ack = 100 — 401 →

D sends Ack (unicast to A)
Seq = 0, Ack = 100

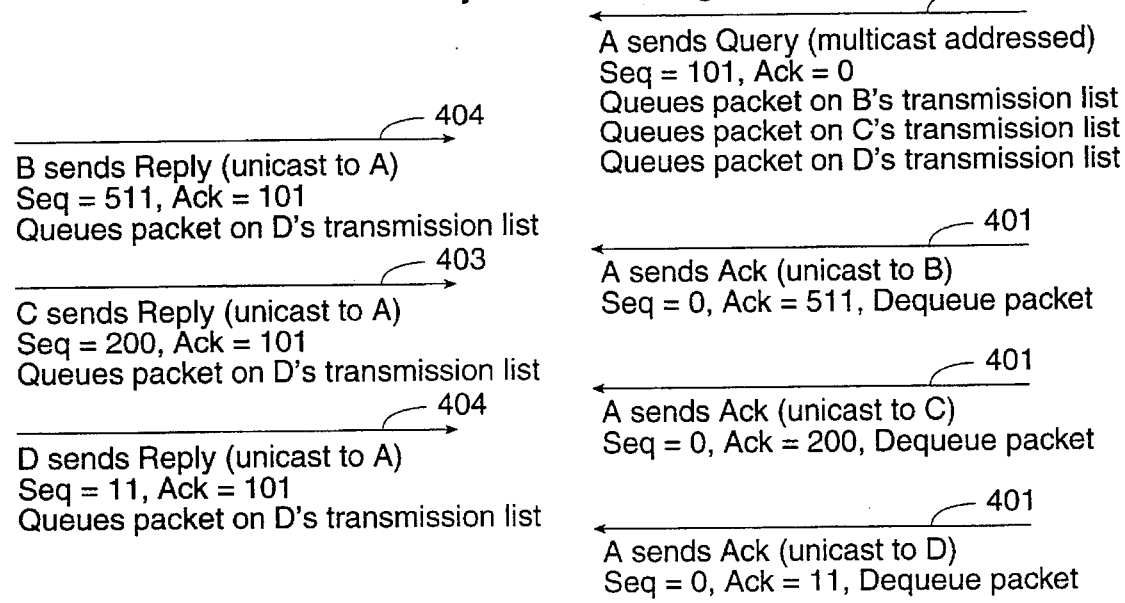

A Query Packet Exchange — 403

A sends Query (multicast addressed)
Seq = 101, Ack = 0
Queues packet on B's transmission list
Queues packet on C's transmission list
Queues packet on D's transmission list

— 404 →

B sends Reply (unicast to A)
Seq = 511, Ack = 101
Queues packet on D's transmission list

— 403 →

— 401

A sends Ack (unicast to B)
Seq = 0, Ack = 511, Dequeue packet

C sends Reply (unicast to A)
Seq = 200, Ack = 101
Queues packet on D's transmission list

— 404 →

— 401

A sends Ack (unicast to C)
Seq = 0, Ack = 200, Dequeue packet

D sends Reply (unicast to A)
Seq = 11, Ack = 101
Queues packet on D's transmission list

— 401

A sends Ack (unicast to D)
Seq = 0, Ack = 11, Dequeue packet

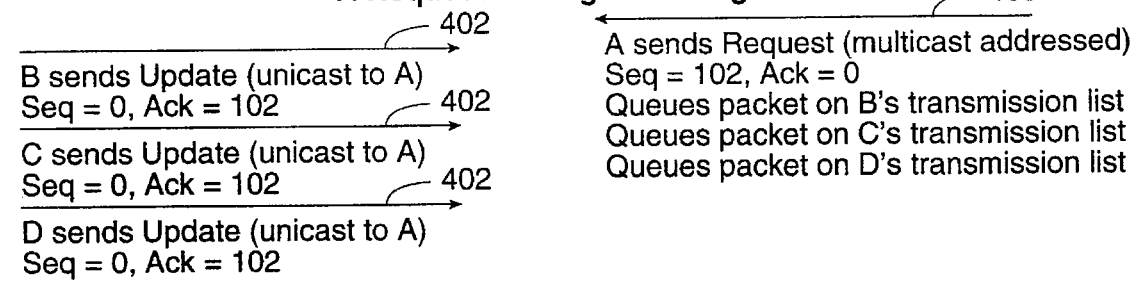

A Request Package Exchange — 405

— 402 →

A sends Request (multicast addressed)
Seq = 102, Ack = 0
Queues packet on B's transmission list
Queues packet on C's transmission list
Queues packet on D's transmission list B sends Update (unicast to A)
Seq = 0, Ack = 102 — 402 →

C sends Update (unicast to A)
Seq = 0, Ack = 102 — 402 →

D sends Update (unicast to A)
Seq = 0, Ack = 102

*FIG. 7*

RELIABLE TRANSPORT PROTOCOL FOR INTERNETWORK ROUTING

BACKGROUND OF THE INVENTION

1. Field of the Invention

This invention relates to transport protocols for internetwork routing.

2. Description of Related Art

In a network of coupled devices, or a collection of such networks, message transmission from senders to recipients may be unreliable, i.e., messages that are sent are not guaranteed to be received properly or in order. Because message transmission in a network may be unreliable, known routing methods include techniques for transmitting messages reliably, i.e., in a manner so that messages are sure to arrive at the intended destination and are sure to arrive in order, if delivery is possible at all. Typically, these methods require that messages to be sent reliably must be sent with a sequence number, which the recipient must acknowledge. The recipient may also be required to reorder received messages by sequence number. Reliable transfer protocols are described in R. Perlman, *Interconnections*, at sections 1.4 and 9.10.2.

One example where reliable message transmission may be preferred is when large blocks of information must be coordinated among several devices, particularly when those large blocks of information may be updated from time to time. One important case where this is generally required is in a collection of networks of coupled devices, in which multiple routers must generally coordinate large blocks of information about the network topology. One method of the prior art is to retransmit the entire block periodically, so that if a message containing a block is lost or misordered, any error introduced by that fact will be redressed with the next transmitted block. While this method achieves the purpose of coordinating multiple devices, it requires a large amount of transmission bandwidth, even when there is no substantial change in network topology.

Another approach to coordinating information among multiple routers is for the routers to send only updates to the information they maintain. This would use substantially less transmission bandwidth, and have the advantage that few messages would be required during periods when the network topology remained substantially unchanged. However, this technique would require that updates be sent reliably, as the undetected loss of an update message would mean that two routers would lose synchronization.

A new routing method called DUAL requires guaranteed and ordered delivery, if delivery is possible at all, of update and other protocol messages. The DUAL method uses reliable delivery to maintain and coordinate a record, among multiple routers, for each possible destination in the collection of networks. One aspect of the DUAL method is the frequent use of multicast transmissions to all neighbors of a particular router.

However, one drawback of the DUAL method, particularly with its frequent use of multicast transmissions, is that it requires each recipient (i.e., each router) to maintain a great deal of state information about receipt and order of protocol packets it receives from each sender (i.e., each neighbor router). For example, each receiver must keep track of what packets it has received, and maintain a set of queues of packets that are received out of order. This greatly complicates operation of each recipient, and is redundant with the same information maintained by each sender. Morevoer, most reliable transmission protocols are connection-oriented, and are thus not suitable for multicast transmissions. It would be advantageous to simply operation of each recipient, for example by maintaining such information only at each sender.

More generally, it would be advantageous to have a method for interspersing multicast and unicast packets, that are to be reliably transmitted, that is simpler and does not require the recipient to maintain information that is redundant with that maintained by the sender. It would also be advantageous to have a method for internetwork routing using multicast and unicast protocol packets, that does not waste transmission bandwidth and does not require routers to maintain excess information.

In a collection of coupled networks, there may be networks or regions of networks that use differing routing protocols. It would be advantageous for routers in one region of the collection of networks to be able to use routing information collected and transmitted by routers in another region, even if those routers use a different routing protocol.

In such a collection of coupled networks, there may be networks with disparate administrative requirements, and it may be desirable to route packets in response to such administrative requirements. For example, it may be desirable for certain packets to be routed entirely within a set of predetermined networks, e.g., for security or policy reasons. It may be desirable for certain packets to be excluded from a set of predetermined networks, e.g., for financial or policy reasons. It may be desirable for certain packets or packets transmitted to certain destinations to receive high priority or low priority, to be routed by the fastest route or the most reliable route. For example, when transmitting sound recordings or when transmitting to certain destinations, it may be desirable for packets to be routed by the method that generates the least delay. It would be advantageous for routers to be able to label destinations that require special routing in response to policy considerations, and to route packets transmitted to those destinations in response to their labels.

Accordingly, it is an object of the invention to provide an improved reliable transport protocol and an improved routing protocol.

SUMMARY OF THE INVENTION

In a first aspect, the invention provides a reliable transport protocol, suitable for routing protocols, that works with unicast transmission and multicast transmission, and an improved routing protocol based thereon. Multicast transmissions can be interspersed with unicast transmissions in situations where some of the receivers have received all of the packets sent to them and others have not. The invention provides a mechanism to deliver multicast packets quickly to some receivers, even when there are unacknowledged packets pending for other receivers. This helps insure that convergence time remains low despite varying speed links.

In a preferred embodiment, when a packet is multicast from a sender node to all of its neighbors, the sender puts the packet on a queue for each neighbor and retransmits the packet if an acknowledgement has not been received within a predetermined period of time (this period of time may be selected in response to a round trip time between the two nodes). If the packet is retransmitted, it is transmitted as a unicast. Each time the packet is retransmitted, the sender waits a longer time for an acknowledgement, until the retry limit is reached. When an acknowledgement is received, the packet is dequeued with respect to that neighbor.

The invention takes advantage of the fact that the sender already has to maintain state information to determine who has not received its packets. The sender can determine which receivers are ready to receive the next packets, and the receivers do not have to maintain this information. The receiver only needs to know the last packet received to detect new packets and duplicate packets; it does not have to accept packets received out-of-order and reorder them for the finite state machine.

In a second aspect, the invention provides a technique for distributing routing information gathered by a router outside an autonomous system of routers using the same routing protocol. A metric calculated by an identical routing protocol or a different routing protocol may be distributed and used by routers in a different autonomous system. The invention also provides a technique by which destinations may be labeled with authentication information or with an administrative tag that specifies a method of routing in response to policy considerations such as security, financial, reliability, application-based policy, or other policy reasons.

The invention is described herein with reference to a preferred embodiment that implements EIGRP, an extension of the IGRP (also called IGRP1) routing protocol described in U.S. Pat. No. 5,088,032, and using the same distance vector routing concept, and a similar metric vector. EIGRP achieves improved loop-free convergence properties and operating efficiency using DUAL. DUAL uses a finite state machine to track the state (passive or active) of each route to each destination in the routing table. A route must be in passive state to be usable. A state transition occurs when there is a topology change in the network. Details of the DUAL finite state machine are described in published papers, and are described herein.

BRIEF DESCRIPTION OF THE DRAWINGS

FIG. 7 shows an example of operation of reliable transport of multicast packets.

DESCRIPTION OF THE PREFERRED EMBODIMENT

Inventions described herein may be made or used in conjunction with inventions described, in whole or in part, in the following patents, publications, or co-pending applications, hereby incorporated by reference as if fully set forth herein:

U.S. Pat. No. 5,088,032, issued in the name of inventor Leonard Bosack, titled "Method and Apparatus for Routing Communications Among Computer Networks".

COMPUTER NETWORK ENVIRONMENT

Figure 1:
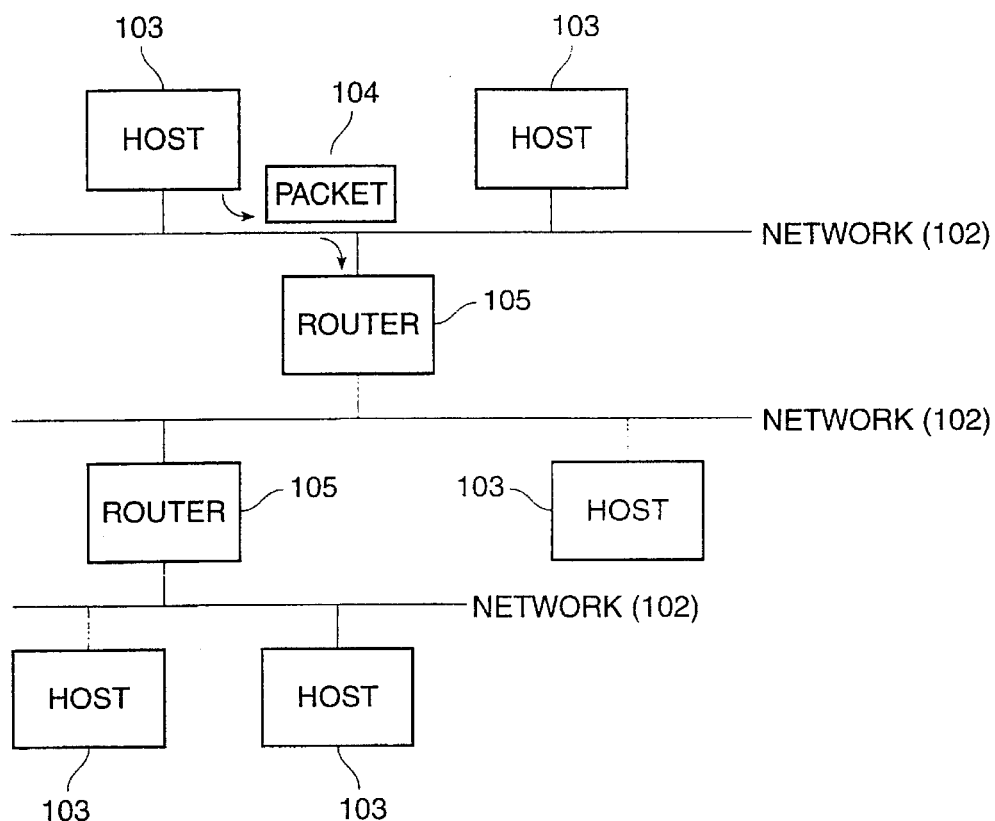
FIG. 1 shows a block diagram of an example network environment for a routing protocol.

FIG. 1 shows a block diagram of an example network environment for a routing protocol.

In a preferred embodiment, the invention may be used in conjunction with a computer network environment such as that shown in FIG. 1. (Those skilled in the art would recognize, after perusal of this application, that the environment shown in FIG. 1 is just an example, and that the invention would also work with other environments.) A network environment 101, sometimes called an "internetwork", may comprise a communication network 102 to which is coupled at least one host 103. Each host 103 may comprise a computer or another device which is capable of receiving a packet 104 from the network and recognizing if that message 104 is addressed to that host 103. At least one host 103 must also be capable of sending a packet 104 onto the network and addressing that packet 104 for a destination.

Computer networks are known in the art, so this application does not describe any particular network in detail. Those skilled in the art would recognize, after perusal of this application, that the invention would work with a variety of known networks, such as Ethernet, FDDI, Token Ring, X.25, and other known networks (both LAN and WAN), and that description of particular details of each such network is not generally required for understanding how to make and use the invention.

In a preferred embodiment, the network environment 101 may comprise a plurality of networks 102, which may possibly be the same kind (e.g., each network 102 may comprise an Ethernet), or may possibly be different kinds (e.g., a first network 102 may comprise an Ethernet, while a second network 102 may comprise a Token Ring). A pair of networks 102 may be linked by a switching device 105, sometimes called "bridge", "gateway", "router", or "brouter". As used herein, a "router" may comprise a switching device 105 that may decide to which one of several networks 102 it may route the packet 104.

THE DUAL FINITE STATE MACHINE

Figure 2:
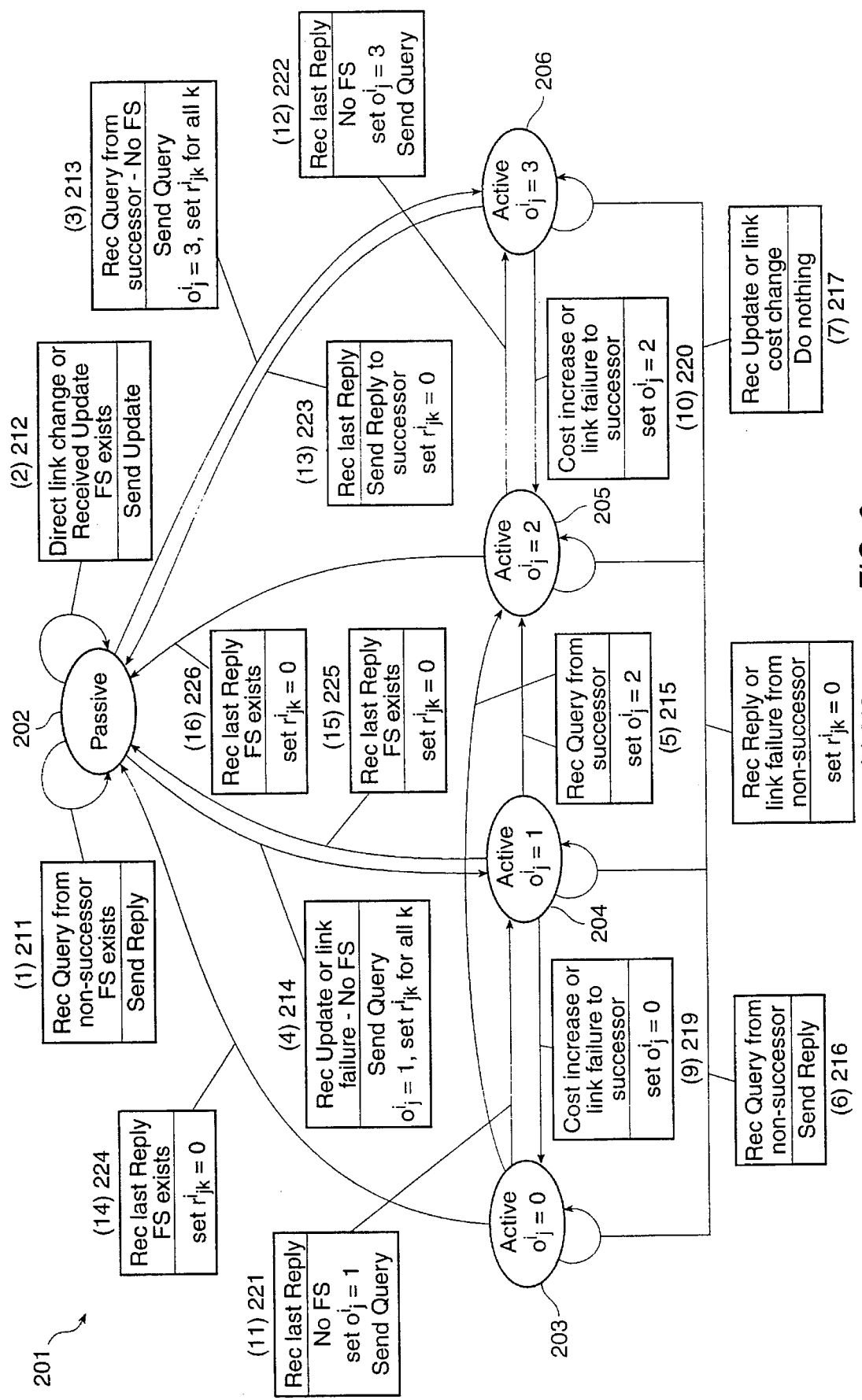
FIG. 2 shows a state diagram of the DUAL finite state machine.

FIG. 2 shows a state diagram of the DUAL finite state machine.

The DUAL finite state machine may be understood in conjunction with the following papers, hereby incorporated by reference as if fully set forth herein:

"A Unified Approach to Loop-Free Routing using Distance Vectors of Link States", J. J. Garcia-Luna-Aceves, 1989 ACM 089791-332-9/89/0009/0212, pages 212–223.

"Loop-Free Routing using Diffusing Computations", J. J. Garcia-Luna-Aceves, Network Information Systems Center, SRI International, to appear in IEEE/ACM Transactions on Networking, Vol. 1, No. 1, 1993.

Briefly, the DUAL finite state machine 201 is executed by a router 105 separately for each destination in the internetwork 101. The router 105 maintains a topology for the internetwork 101, that shows a metric of distance for each possible destination. For each destination, the router 105 also maintains a feasible successor, that is the neighbor to which the router 105 may switch messages to have them delivered to that destination. To prevent loops, the router 105 will only select the feasible successor from among those neighbor routers 105 in the internetwork 101 that are downstream (i.e., closer according to the distance metric) to the destination.

Figure 3:
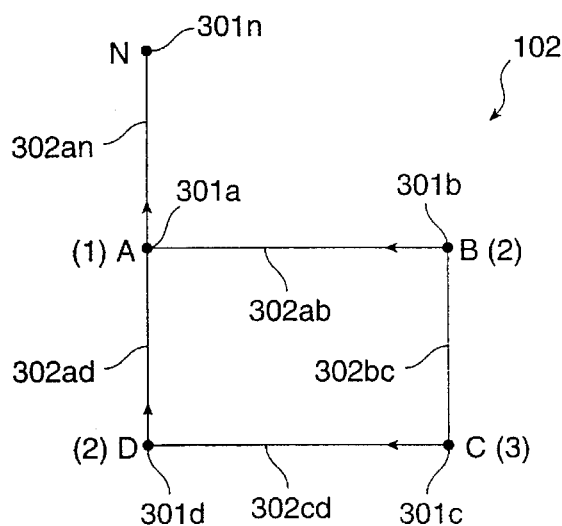
FIG. 3 shows a block diagram of an example network topology.

FIG. 3 shows a block diagram of an example network topology.

In this example, a network 102 comprises nodes 301n N, 301a A, 301b B, 301c C, and 301d D, with point-to-point links 302an, 302ab, 302ad, 302bc, and 302cd between pairs of nodes 301n, 301a, 301b, 301c, and 301d, as shown in FIG. 3. This example shows operation of the DUAL finite state machine after failure of various single point-to-point links in the network.

Figure 4A:
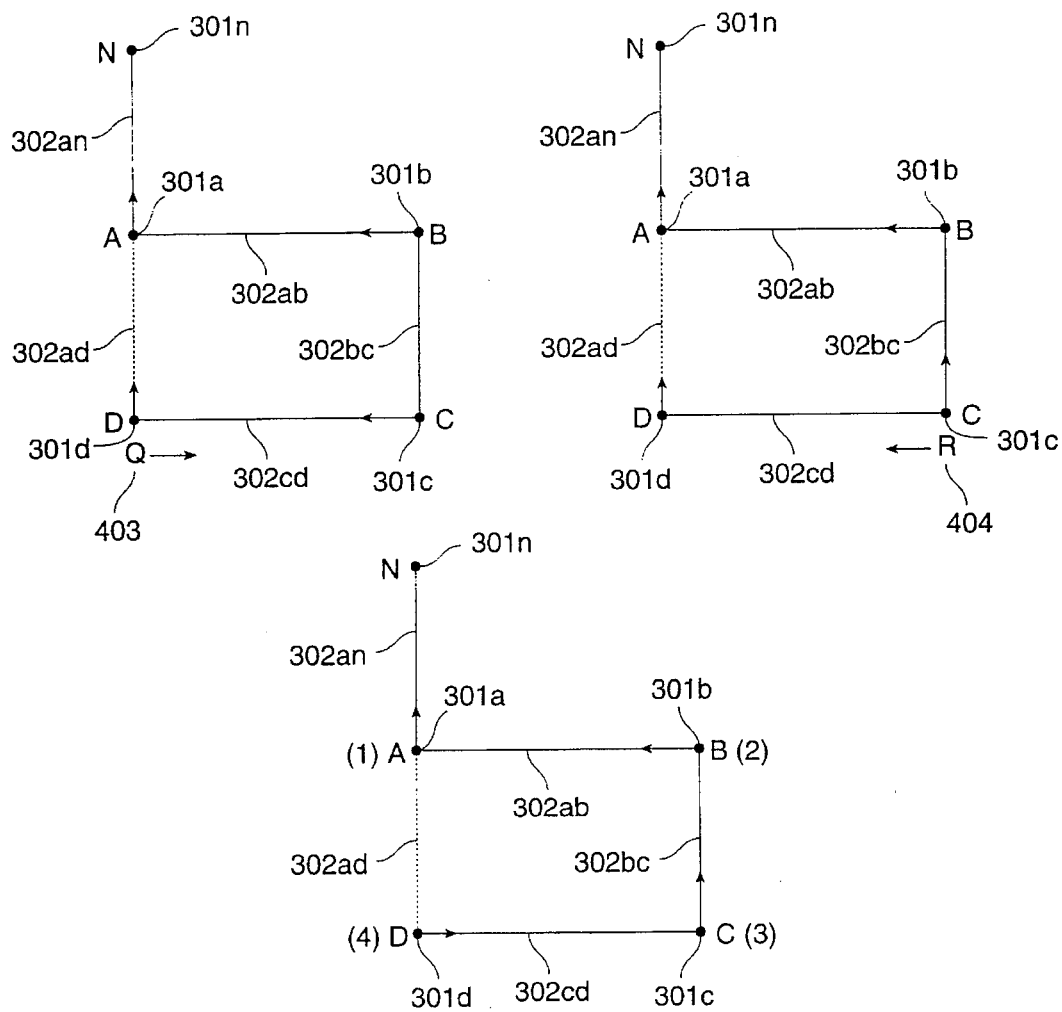
FIGS. 4A and 4B show operation of the DUAL finite state machine when links in the example network of FIG. 3 fail.
Figure 4B:
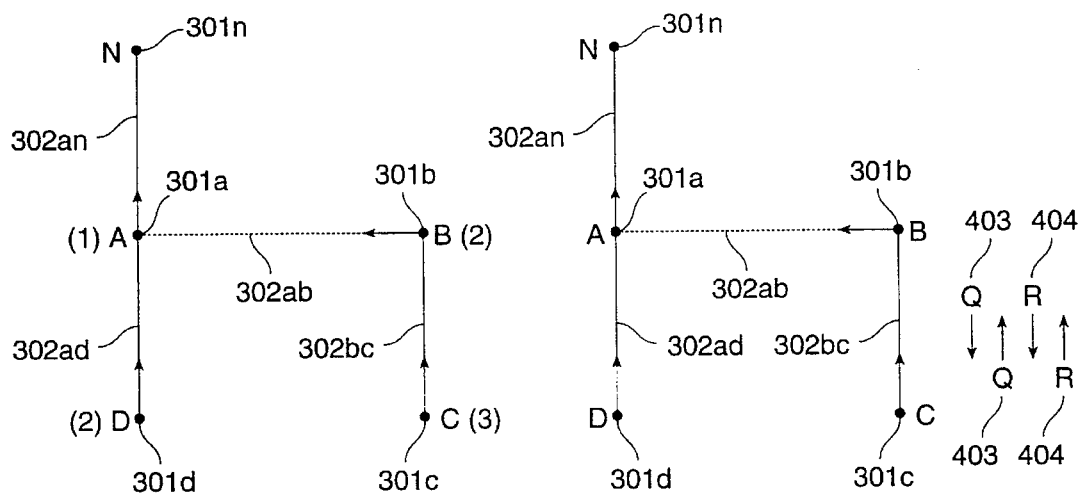

FIGS. 4A and 4B show operation of the DUAL finite state machine after failure various single point-to-point links in the example network of FIG. 3.

In the example shown in FIG. 4A, the link 302ad between node D 301d and node A 301a fails. Node D 301d marks its route to node N 301n "active", and sends a query packet 403 to all its neighbor nodes. In this example, the only neighbor node is node C 301c. Node C 301c has a feasible successor for its route to node N 301n, so it sends a reply packet 404 to node D 301d naming its feasible successor, which is node B 301b. Node D 301d then sets its feasible successor to be node C 301c for its route to node N 301n.

In the example shown in FIG. 4B, there is no link between node D 301d and node C 301c, and the link 302ab between node A 301a and node B 301b fails. Node B 301b marks its route to node N 301n "active", and sends a query packet 403 to all its neighbor nodes 301. In this example, the only neighbor node 301 is node C 301c. Node C 301c has no feasible successor for its route to node N 301n, so it sends a query packet 403 as its response to node B 301b. Node C 301c also sends a query packet 403 to each of its other neighbor nodes (there are none).

Node B 301b has now received responses to its query packets 403 from each of its neighbor nodes (its only neighbor is node C 301c). It knows it has no neighbor node with a passive route to node N 301n, so it responds to the query packet 403 from node C 301c with a reply packet 404 saying that it does not have a route to node N 301n. Node C 301c can then draw the same conclusion, so it responds (a second time) to the query packet 403 from node B 301b with a reply packet 404 saying that it does not have a route to node N 301n either.

SOFTWARE STRUCTURE OF A PROTOCOL ENGINE

Figure 11:
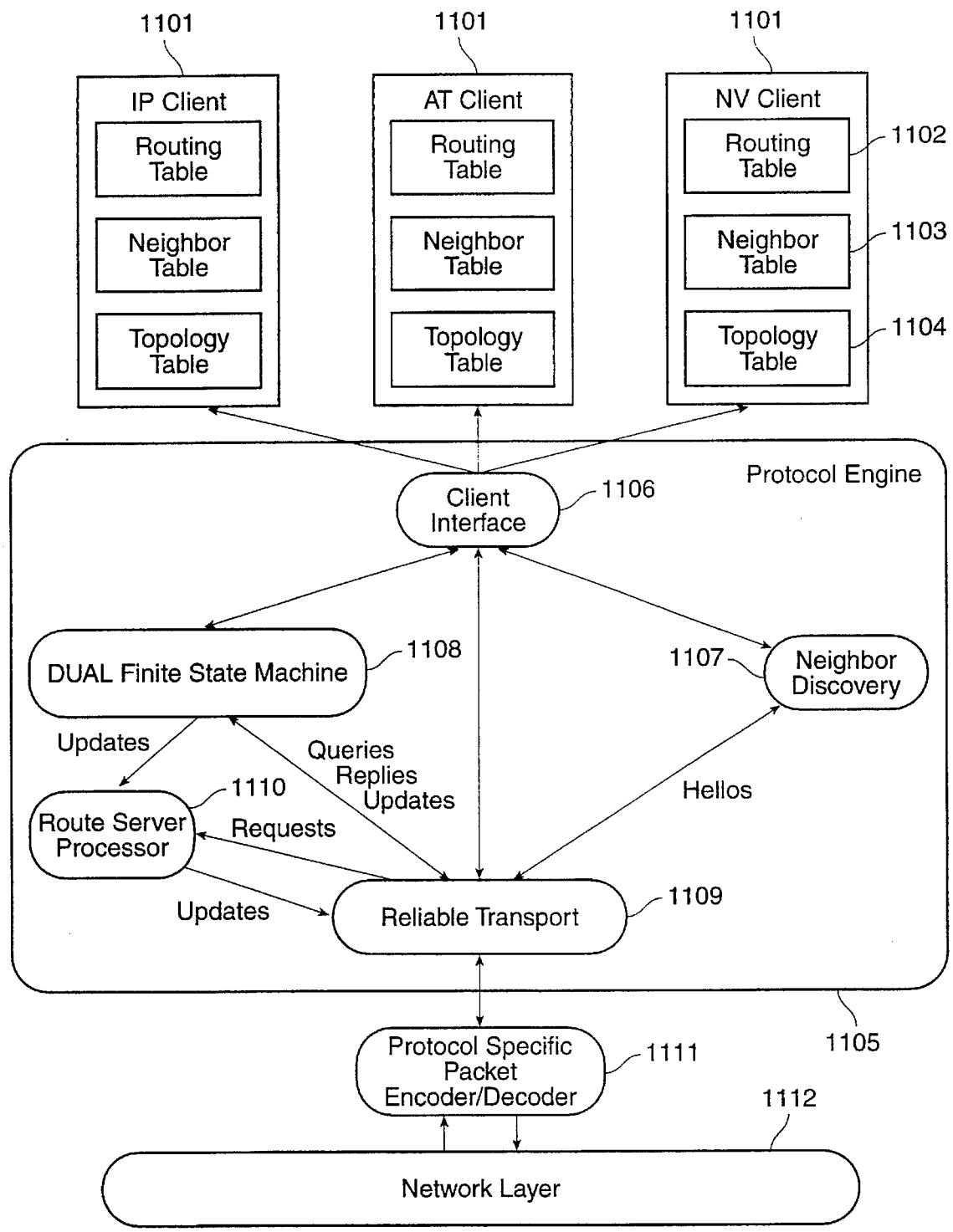
FIG. 11 shows a block diagram of software layering of an implementation of an EIGRP Protocol Engine.

FIG. 11 shows a block diagram of software layering of an implementation of an EIGRP Protocol Engine.

In a preferred embodiment, a routing protocol may be implemented in a semi-integrated manner. A separate client 1101 may be maintained for three different protocols, IP (Internet Protocol), AT (Appletalk) and NV (Novell). Each client 1101 may comprise a separate routing table 1102, neighbor table 1103, and topology table 1104. Each client 1101 may interface to a single protocol engine 1105 by means of a client interface 1106.

The client interface 1106 may comprise a set of interface standards and programs for preparing and updating data for each client 1101. The client interface 1106 may be coupled to a neighbor discovery element 1107, a DUAL finite state machine 1108, and a reliable transport element 1109. The neighbor discovery element 1107 may comprise software for recognizing neighbor routers 105. Neighbor discovery is known in the art. The DUAL finite state machine 1108 may implement the DUAL finite state machine described herein. The reliable transport element 1109 may implement acknowledgment and retransmission, and the multicast/unicast reliable transmission technique described herein.

In a preferred embodiment, the sender must retransmit any packet that is required to be acknowledged, but is not acknowledged within a predetermined period of time after it is sent. That period of time may be selected in response to an expected delay time for transmission and response to the neighbor router 105, generally the expected time for transmission, plus the expected time for transmission of the acknowledgment, plus a small constant. If no acknowledgment is received, the router 105 will retransmit. If acknowledgment continues to be missing, the router 105 will repeatedly increase the lag time allowed and retransmit, until a predetermined number of tries has been made. After that, the router 105 will treat the link to that neighbor router 105 as if it has failed. Details of acknowledgment and retransmission are known in the art.

The DUAL finite state machine 1108 and the reliable transport element 1109 may be coupled to a router server processor 1110, which may determine routes for each destination address that is recognized.

The protocol engine 1105 may be coupled to a protocol specific packet encoder/decoder 1111, which may package packets for transmission in one of a set of encapsulation protocols, as is known in the art. The packet encoder/decoder 1111 may be coupled to a network layer 1112, which may conduct actual packet transmission and reception using IP packets, DDP packets, or IPX packets, as is known in the art.

PACKET TYPES AND THEIR USE IN THE PROTOCOL

FIGS. 5, 6, 7, 8, 9, and 10 show several possible packet exchanges and the uses of packet types in the protocol.

In a preferred embodiment, five types of packets may be transmitted between routers 105. These are: HELLO packets (also called ACK packets because they are used for acknowledgments) 401, UPDATE packets 402, QUERY packets 403, REPLY packets 404, and REQUEST packets 405.

Hello packets 401 may be multicast when a router 105 is first started, to indicate that a topology update is requested.

Hello packets 401 are also used as ack packets, and so are unicast in response to a packet that requires acknowledgment.

Update packets 402 may be multicast to all neighbor routers 105, in response to a topology change in the network 102, i.e., an increase or decrease in the routing metric to a destination, or may be unicast to a specific neighbor router 105, in response to a HELLO PACKET 401. Update packets 402 may also be unicast when a multicast update packet 402 is not acknowledged by one or more specific neighbor routers 105, as disclosed herein.

Query packets 403 may be multicast, in response to losing a feasible successor to a destination, or may be unicast, in response to a query packet 403 where the router 105 receiving a query packet 403 also does not have a feasible successor. In this case, however, the neighbor router 105 initiates its own multicast query packet 403 and must eventually respond to the originator of the first query packet 403 with a reply packet 404. Query packets 403 may also be unicast when a multicast query packet 403 is not acknowledged by one or more specific neighbor routers 105, as disclosed herein.

Reply packets 404 are always unicast, in response to a multicast query packet 403 or a unicast query packet 403.

Request packets 405 are may be multicast or unicast; a request packet 405 indicates a request for a topology update. Request packets 405 are not presently implemented in a preferred embodiment.

Each packet may have a sequence number 406, to indicate that an acknowledgment is required, and an acknowledgment field, to indicate that the packet acknowledges receipt of another packet. Multicast packets have their acknowledgement field set to zero to indicate that they do not acknowledge receipt of another packet. In general, there is no common sequence number of another packet to acknowledge for each recipient of the multicast packet. Each packet may also have zero or more TLV formats, to indicate particular properties of the packet or data to be transmitted with the packet.

In a preferred embodiment, update packets 402, query packets 403, and reply packets 404 are sent "reliably", i.e., they are each sent with sequence numbers to indicate that acknowledgment is required, and they are each retransmitted when acknowledgment is not forthcoming within an expected time period. Other types of packets may be sent "unreliably", i.e., they are each sent with a sequence number of zero, to indicate that no acknowledgment is required. When an update packet 402 or query packet 403 is multicast, it must be acknowledged by each recipient; otherwise it is queued for retransmission to each recipient that does not acknowledge it by a subsequent unicast of the same packet.

A router 105 may thereafter intend to send a multicast packet that would be out of sequence for some recipient, i.e., that recipient has not acknowledged a prior packet. The sending router 105 can tell that the packet would be out of sequence because that recipient, having not acknowledged receipt of a prior packet, still has at least one packet queued for transmission to it. When this occurs, the sending router 105 multicasts a hello packet 401 with a SEQUENCE_TLV format set to indicate all those recipients for whom the multicast packet is out of sequence. All other recipients enter a conditional-receive mode ("CR mode"), in which they will conditionally receive the next packet. The sending router 105 then multicasts the next packet with a CR flag set, to indicate that it should be conditionally received. All recipients that were listed in the SEQUENCE_TLV (or did not receive it) will not be in CR mode and will ignore the packet with the CR flag set. The sending router 105 can then unicast the packets to those recipients in the correct order.

Figure 5:
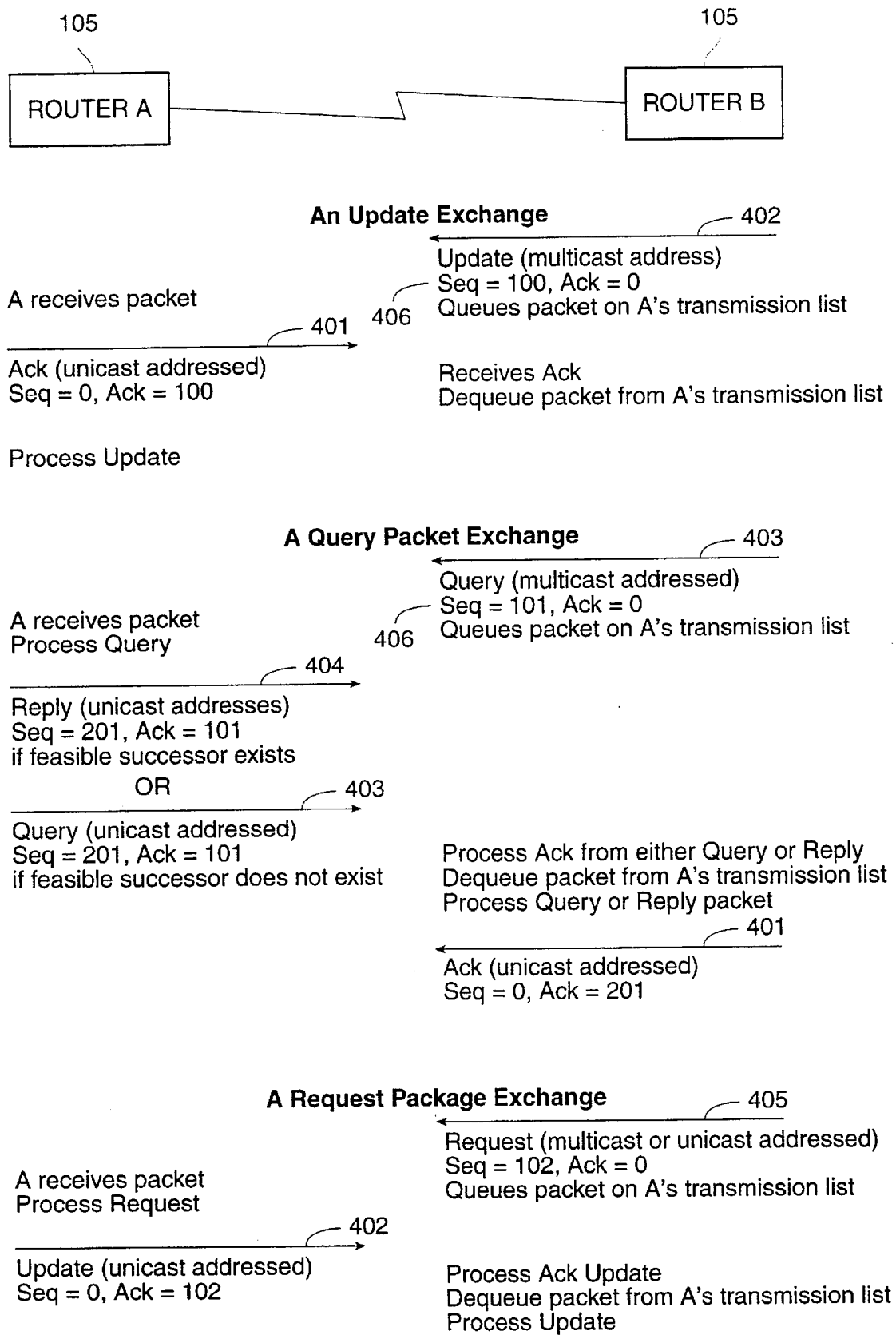
FIG. 5 shows an example update packet exchange, an example query packet exchange, and an example request packet exchange.

FIG. 5 shows an example update packet exchange, an example query packet exchange, and an example request packet exchange.

In an example update packet exchange, router B 105 sends a multicast update packet 402 to router A 105, with a sequence number 406 to indicate that the packet should be acknowledged. Router A 105 receives the multicast update packet 402 and responds with an ack packet 401. Router B 105 receives the ack packet 401 and dequeues the update from its transmission list for router A 105. Router A 105 processes the update.

In an example query packet exchange, router B 105 sends a multicast query packet 403 to router A 105, with a sequence number 406 to indicate that the packet should be acknowledged. Router A 105 receives the multicast query packet 403 and responds with a reply packet 404 (always unicast) if it has a feasible successor; the reply packet 404 acknowledges the multicast query packet 403, with a sequence number to indicate that the reply should also be acknowledged. Alternatively, router A 105 receives the multicast query packet 403 and responds with a unicast query packet 403 if it does not have a feasible successor; the unicast query packet 403 acknowledges the multicast query packet 403 and has a sequence number set to indicate that the unicast query should also be acknowledged. In either case, router B 105 receives the packet from router A 105, responds with an ack packet 401, and dequeues the multicast query from its transmission list for router A 105.

In an example request packet exchange, router B 105 sends a request packet 405 (multicast or unicast), with a sequence number 406 to indicate that the packet should be acknowledged. Router A 105 receives the request packet 405, processes the request, and responds with an update packet 402. Router B 105 receives the update packet 402 and dequeues the update from its transmission list for router A 105. Router B 105 processes the update.

Figure 6:
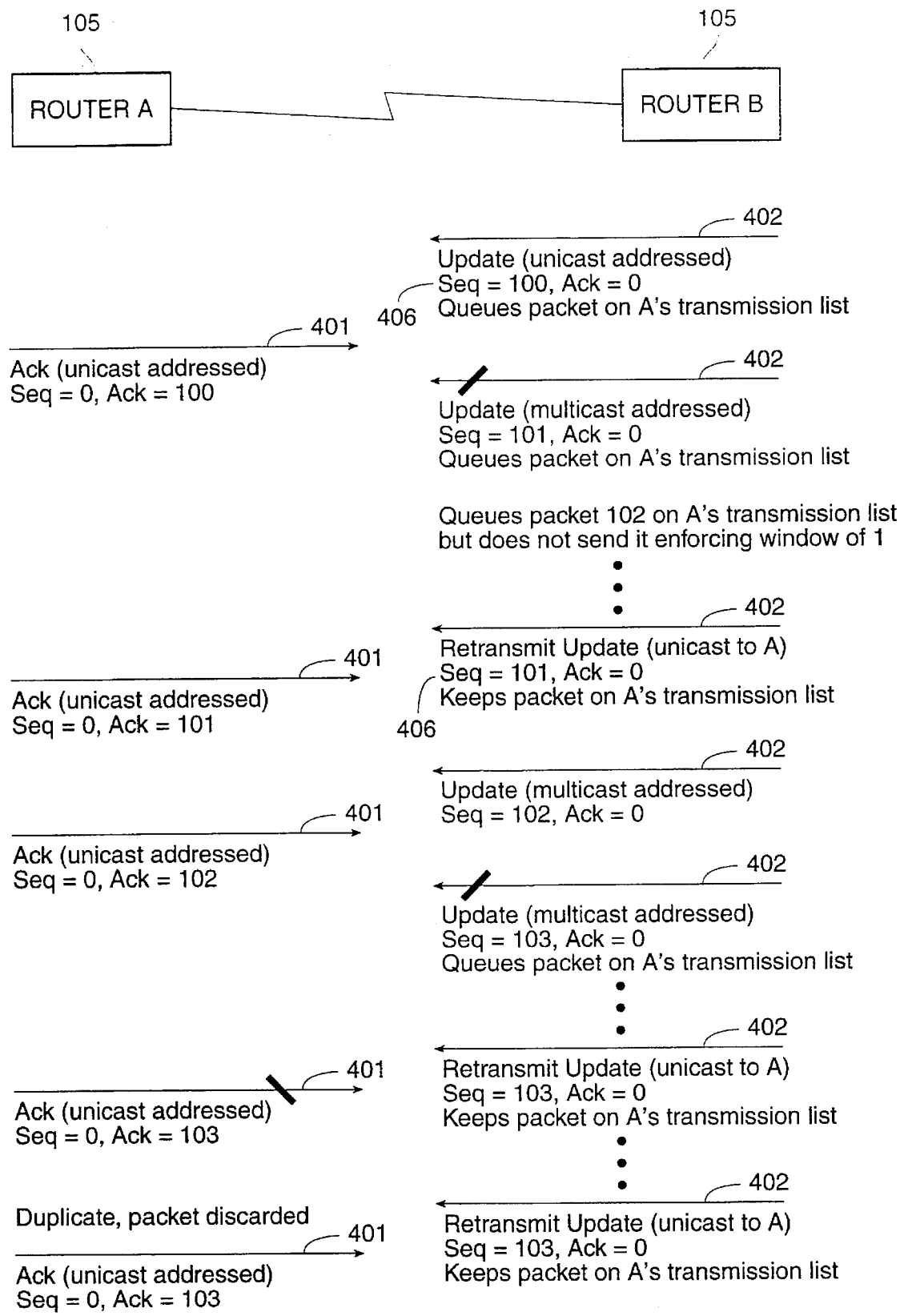
FIG. 6 shows an example of operation of reliable transport of update packets, query packets, and request packets on lossy point-to-point links.

FIG. 6 shows an example of operation of reliable transport of update packets, query packets, and request packets on lossy point-to-point links.

In a first example update packet exchange, router B 105 sends a multicast update packet 402 to router A 105, with a sequence number 406 to indicate that the packet should be acknowledged. If router A 105 does not receive (or does not acknowledge receipt of) the multicast update packet 402, router B 105 retransmits the update to router A 105, by sending a unicast update packet 402 to router A 105.

FIG. 7 shows an example of operation of reliable transport of multicast packets.

In an example multicast update exchange, router A 105 sends a multicast update packet 402 to routers 105 B, C, and D, with a sequence number 406 to indicate that the packet should be acknowledged. Each one of routers 105 B, C, and D responds with an ack packet 401. Router A 105 receives each one of the ack packets 401 and dequeues the update from its transmission lists for routers 105 B, C, and D.

In an example multicast query packet exchange, router A 105 sends a multicast query packet 403 to routers 105 B, C, and D, with a sequence number 406 to indicate that the packet should be acknowledged. Each one of routers 105 B, C, and D responds with either a query packet 403 or a reply packet 404, each with a sequence number 406 to indicate that the response should also be acknowledged. Router A 105 receives each of the responses, sends an ack packet 401 to each of routers 105 B, C, and D, and dequeues the query from its transmission list for each of routers 105 B, C, and D.

In an example multicast request packet exchange, router A 105 sends a multicast request packet 405 to routers 105 B, C, and D, with a sequence number 406 to indicate that the packet should be acknowledged. Each one of routers 105 B, C, and D responds with an update packet 402. Router A 105 receives each of the update packets 402 and dequeues the request from its transmission list for each of routers 105 B, C, and D.

Figure 8:
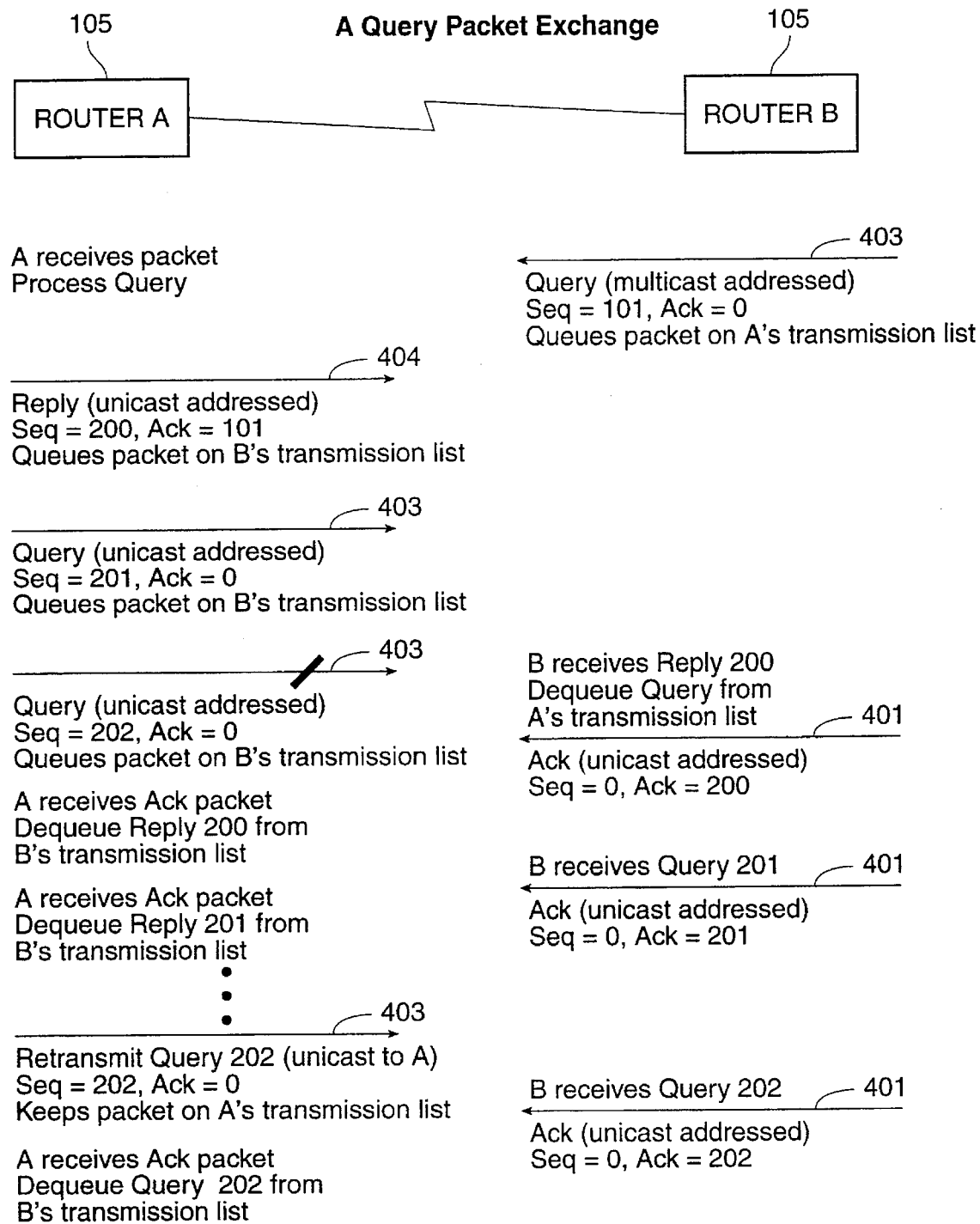
FIG. 8 shows an example of multiple packet responses in a query packet exchange sequence.

FIG. 8 shows an example of multiple packet responses in a query packet exchange sequence.

In an example multicast query packet exchange, router B 105 sends a multicast query packet 403 to routers 105 including router A 105, with a sequence number 406 to indicate that the packet should be acknowledged. If a query packet 403 is originated for multiple destination nodes 301, a receiving router 105 may respond with reply packets 404 for some destinations and with query packets 403 for other destinations. In this example, router A 105 responds with a reply packet 404, with a sequence number 406 to indicate that the reply should also be acknowledged. Router A 105 also sends a first unicast query packet 403 to router B 105, with sequence number 406 to indicate that it should be acknowledged, and a second unicast query packet 403 to router B 105, with another sequence number 406 to indicate that it should be acknowledged. However, the second one of these query packets 403 is lost in transmission.

Router B 105 receives only the reply packet 404 and the first query packet 403 and responds with an ack packet 401 for each of them. Router A 105 receives these ack packets 401 and dequeues the reply packet 404 and the first query packet 403 from its transmission list for B. Router A 105 retransmits the second query packet 403, with a sequence number to indicate that it should be acknowledged. Router B 105 receives this packet and responds with an ack packet 401. Router A 105 receives the ack packet 401 and dequeues the second query packet 403 from its transmission list for B.

Figure 9:
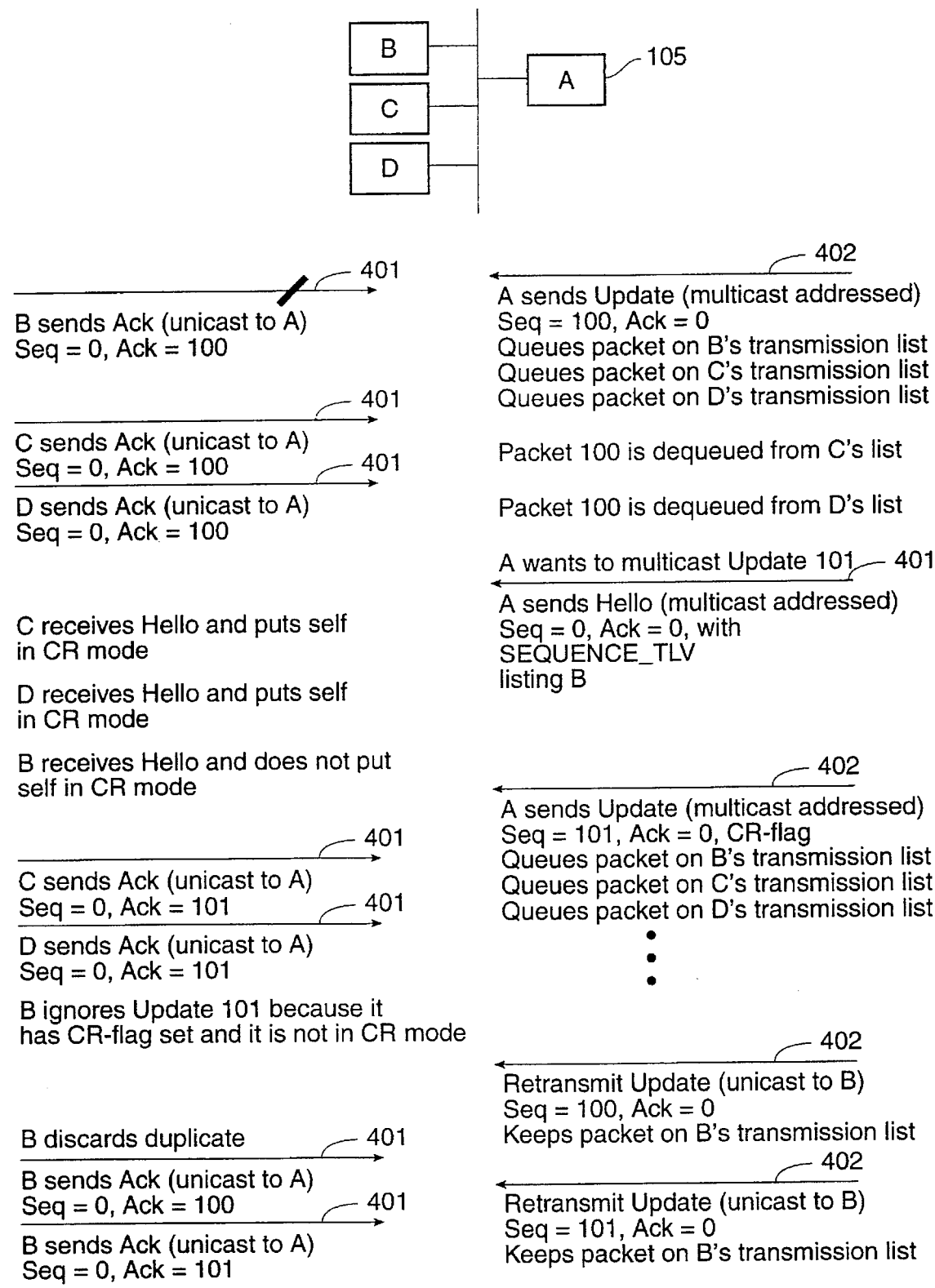
FIG. 9 shows an example of multicast and unicast packets being sent close together.

FIG. 9 shows an example of multicast and unicast packets being sent close together.

In this example, router A 105 sends a multicast update packet 402 to routers 105 B, C, and D. Routers 105 B, C, and D each receive this packet and each respond with an ack packet 401. However, in this example, the ack packet 401 from router B 105 is lost. (Alternatively, the update packet 402 to router B 105 could have been lost, with the same effect.) Router A 105 receives the two ack packets 401 and dequeues the update from its transmission lists for C and D.

Router A 105 now plans to send a second multicast update packet 402, but it knows that router B 105 has not acknowledged the first one. Accordingly, it considers that the second multicast update packet 402 will be out of sequence for router B 105, so it sends a hello packet 401 with a SEQUENCE_TLV parameter listing router B 105. The SEQUENCE_TLV parameter tells all listeners to this hello packet 401 that they should enter conditional-receive mode ("CR" mode) only if they are not listed in it. All three routers 105 B, C, and D receive the hello packet 401, but since router B 105 is listed in it, only routers 105 C and D place themselves in CR mode.

Router A 105 then sends its second multicast update packet 402, with a sequence number to indicate that it should be acknowledged, and with a CR flag set. Routers 105 C and D are in CR mode, so they each receive the packet, and each respond with ack packets 401. Router B 105 is not in CR mode, so it ignores the packet and does not respond with an ack packet 401. Router A 105 receives the two ack packets 401 and dequeues the update from its transmission lists for C and D.

Router A 105 then retransmits the first update packet 402 by unicasting it to router B 105, with its original sequence number. Router B 105 receives the packet and responds with an ack packet 401. (Router B 105 already has this update, so it can discard the packet after acknowledgment.) Router A 105 then retransmits the second update packet 402 by unicasting it to router B 105, with its original sequence number. Router B 105 receives this packet also and responds with an ack packet 401. Router A 105 receives the ack packets 401 and dequeues both updates from its transmission list for B.

Figure 10:
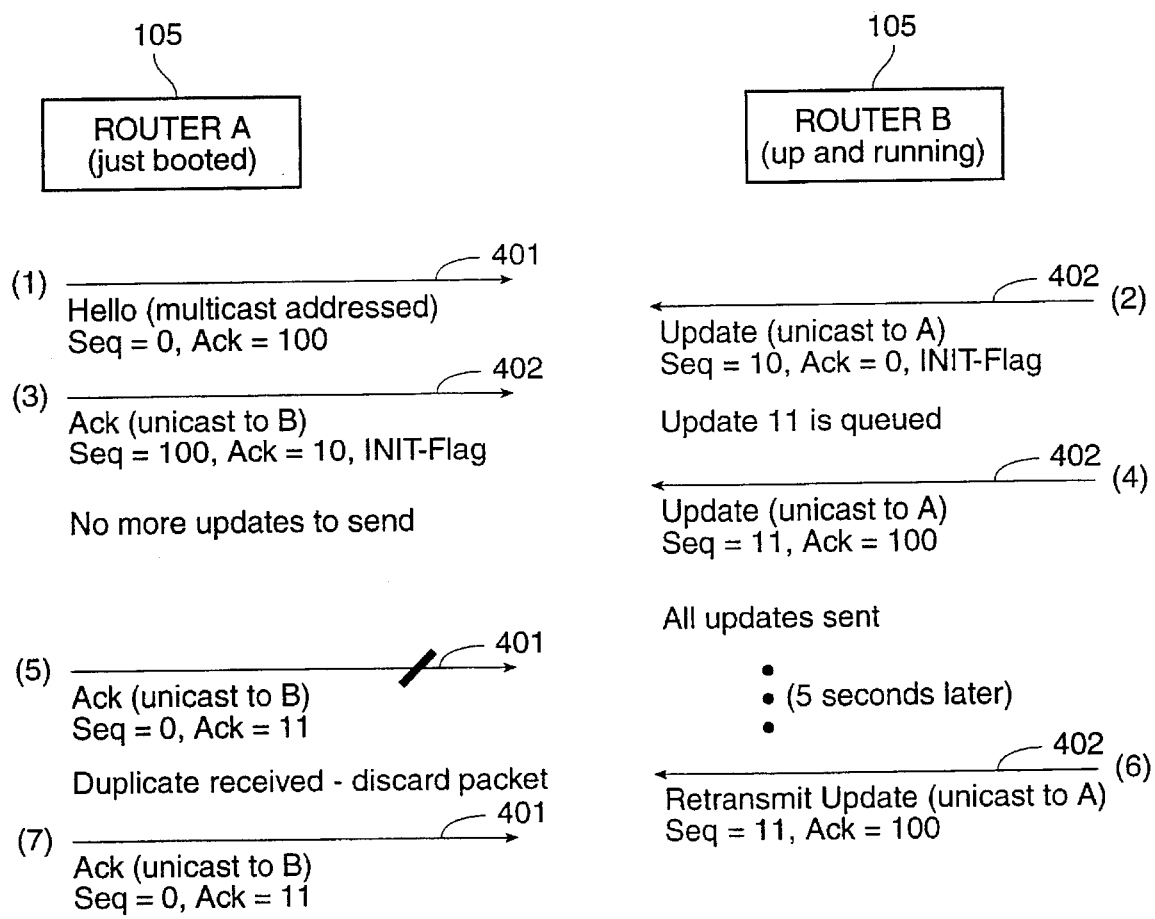
FIG. 10 shows an example of an initializing update packet exchange.

FIG. 10 shows an example of an initializing update packet exchange.

When a router A 105 is first started, it may send a multicast hello packet 401 to its neighbor routers 105 such as router B 105, to indicate a request for their topology information. Each neighbor router B 105 responds with a unicast update packet 402 to the new neighbor router 105 A, with an INIT flag set to indicate that the update is very long and requires two update packets 402 (the second is queued and is only sent when the first update packet 402 is acknowledged). In this example, the ack packet 401 acknowledging the first update packet 402 is lost, so router B 105 must retransmit its first update packet 402 until it is acknowledged.

EXAMPLE HEADERS AND DATA FOR PROTOCOL PACKETS

Figure 12:
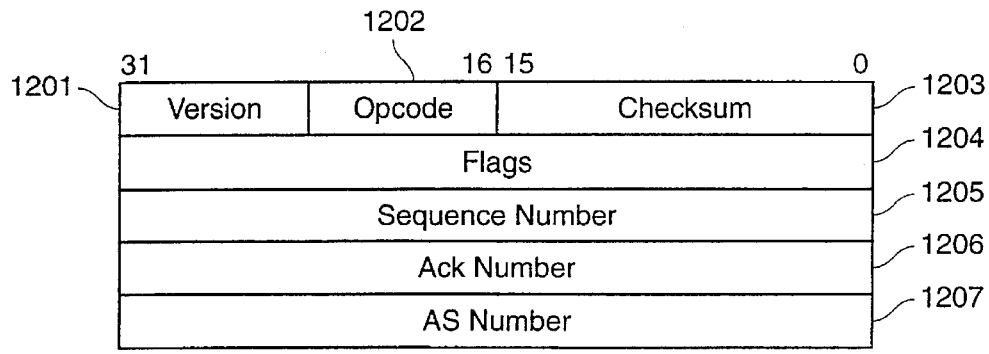
FIG. 12 shows a block diagram of a fixed header for EIGRP packets.

FIG. 12 shows a block diagram of a fixed header for EIGRP packets.

In a preferred embodiment, a fixed header for EIGRP packets may comprise a version number 1201 (always 2), an opcode 1202 (to indicate the type of packet as HELLO/ACK, UPDATE, REQUEST, QUERY, or REPLY), a checksum 1203, a set of flags 1204, a sequence number 1205, an acknowledgment number 1206, and an AS number 1207.

The flags 1204 may comprise an INIT flag (hexadecimal 01), which may be set to indicate an update packet 402 sent to a newly discovered neighbor router 105. The flags 1204 may also comprise a CR flag (hexadecimal 02), which may be sent to indicate that the packet should be received only if the recipient is in CR mode.

The sequence number 1205 and the acknowledgment number 1206 are described herein with reference to FIGS. 5–10.

The AS number 1207 may comprise an identifying number for an autonomous system of EIGRP routers 105. A router 105 that receives and accepts a packet from a neighbor router 105 must have the same AS number 1207 as its neighbor router 105 or it will ignore the packet.

Figure 13A:
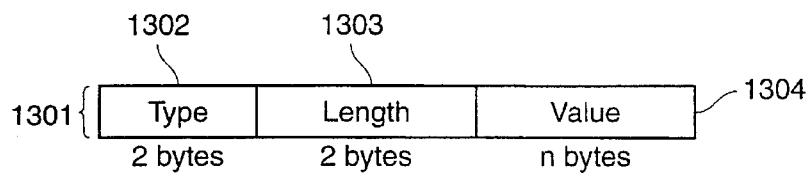
FIGS. 13A and 13B show a block diagram of a TLV format for a packet parameter.
Figure 13B:
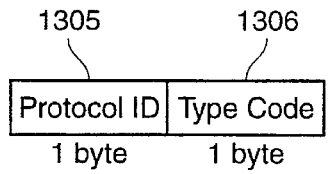

FIGS. 13A and 13B show a block diagram of a TLV format for a packet parameter.

A TLV format 1301 may comprise a type field 1302, a length field 1303, and a value field 1304. The type field 1302 may comprise a protocol ID 1305 and a type code 1306.

In a preferred embodiment, the protocol ID 1305 may comprise one of the following values:

| General TLV | 00 | IP | 01 |
|---|---|---|---|
| AppleTalk | 02 | Novell IPX | 03 |

In a preferred embodiment, the type code 1306 may comprise one of the following:

PARAMETER_TYPE (hexadecimal 0001) conveys computation weights for the EIGRP metric, as well as hold-time values for retransmission. This TLV format may also be used in an initial update packet 402 when a neighbor router 105 is discovered.

AUTHENTICATION_TYPE (hexadecimal 0002) conveys authentication type and data. As noted herein, when a router 105 does not match the AUTHENTICATION_TYPE field, the packet is ignored.

SEQUENCE_TYPE (hexadecimal 0003) informs receivers that the next multicast packet will have the CR flag set, and lists those recipients for which the next multicast packet will be out of sequence.

IP_REQUEST_TYPE (hexadecimal 0101) requests routing information for specific IP destinations. This TLV format is only used in a request packet 405. If a request packet 405 is sent with an empty IP_REQUEST_TYPE field, the request packet 405 is for all destinations. Similar TLV formats may request routing information for AT or NV networks.

IP_METRIC_TYPE (hexadecimal 0102) conveys IP destination and associated metric information for TCP/IP networks. Routes described in this TLV format may comprise EIGRP network interfaces as well as network routes learned from other EIGRP routers 105. Similar TLV formats may convey information for AT or NV networks.

IP_EXTERIOR_TYPE (hexadecimal 0103) conveys IP destination and associated metric information for TCP/IP networks learned from non-EIGRP routers 105. This TLV format includes the identity of the routing protocol that created the route, the metric assigned by the external protocol, the AS number 1207 of the EIGRP autonomous system, an indicator for determining whether the external router 105 should be marked as part of an EIGRP autonomous system, and a network "administrator tag" to be used for route filtering and other processing at AS boundaries. Similar TLV formats may convey information for AT or NV networks.

Figure 14:
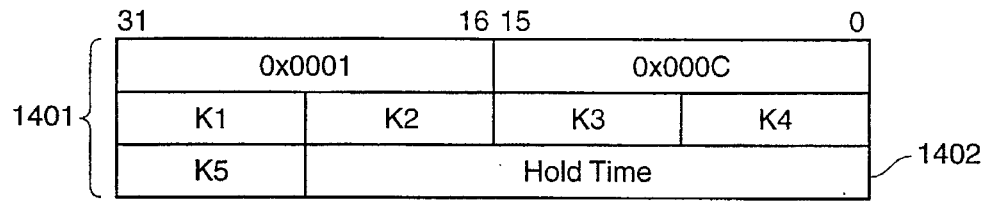
FIG. 14 shows a block diagram of a parameter type TLV format.

FIG. 14 shows a block diagram of a parameter type TLV format.

The parameter type TLV format 1401 may comprise computation weights for each component of the EIGRP metric. In a preferred embodiment these may comprise weights K1, K2, K3, K4, and K5, as used in the following formula:

$$[K1*bandwidth+(K2*bandwidth)/(256-load)+ K3*delay]*[K5/(reliability+K4)]$$

In a preferred embodiment, K2=K4=K5=0 and K1=K3=1.

The parameter type TLV format 1401 may also comprise a hold time 1402, which is the amount of time in seconds a receiving router 105 should consider sending neighbor router 105 to be valid, i.e., one that is able to forward packets and participates in EIGRP. If neighbor router 105 is considered valid, the router 105 will store all routing information advertised by that neighbor router 105.

Figure 15:
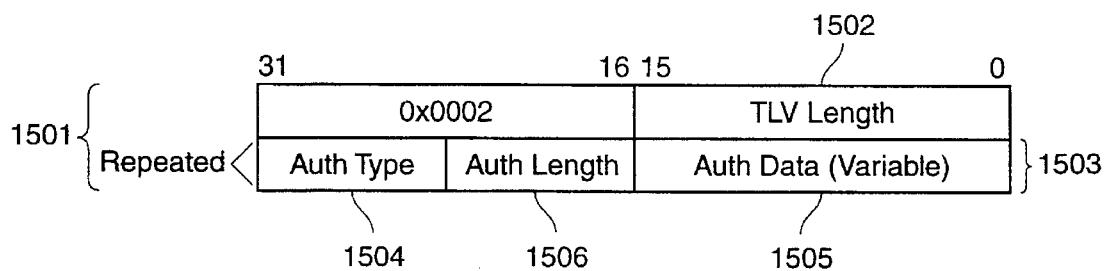
FIG. 15 shows a block diagram of a authentication type TLV format.

FIG. 15 shows a block diagram of a authentication type TLV format.

The authentication type TLV 1501 may comprise a TLV length 1502 and a set of authentication type TLV data elements 1503. Each data element 1503 may comprise a type of authentication 1504, an authentication data variable 1505, and a length field 1506 to indicate a length for the authentication data variable 1505.

In a preferred embodiment, authentication is based on matching the AS number 1207 in the fixed header.

Figure 16:
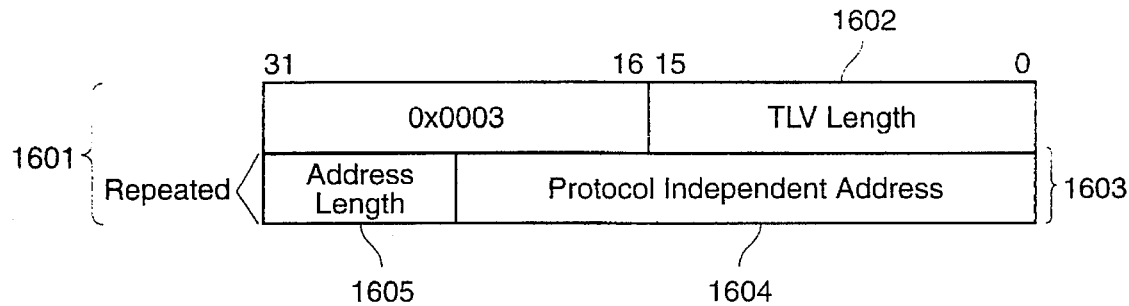
FIG. 16 shows a block diagram of a sequence type TLV format.

FIG. 16 shows a block diagram of a sequence type TLV format.

The sequence type TLV 1601 may comprise a TLV length 1602 and a set of sequence type TLV data elements 1603. Each data element 1603 may comprise a protocol independent address 1604 and a length field 1605 to indicate a length for the protocol independent address 1604. For IP, this length is 4 bytes; for AppleTalk, is it 4; for Novell IPX, it is 10.

Figure 17:
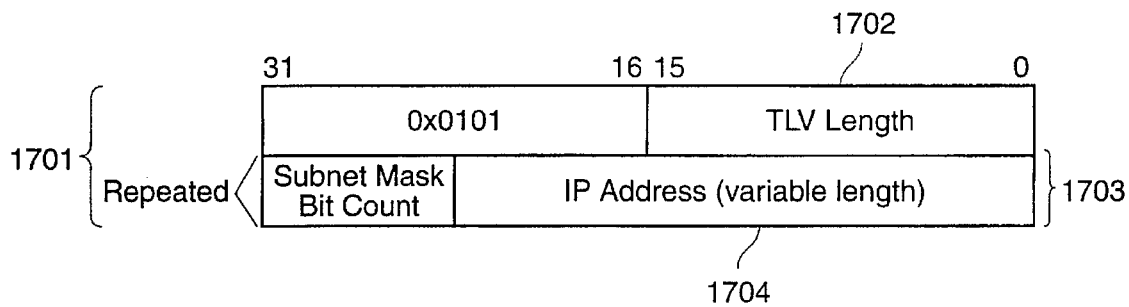
FIG. 17 shows a block diagram of an IP request type TLV format.

FIG. 17 shows a block diagram of an IP request type TLV format.

The IP request type TLV format 1701 may comprise a TLV length 1702 and a set of IP request TLV data elements 1703. Each data element 1703 may comprise an IP address 1704.

TLV formats for an AppleTalk request type and a Novell network request type are similar to the TLV format for the IP request type.

Figure 18:
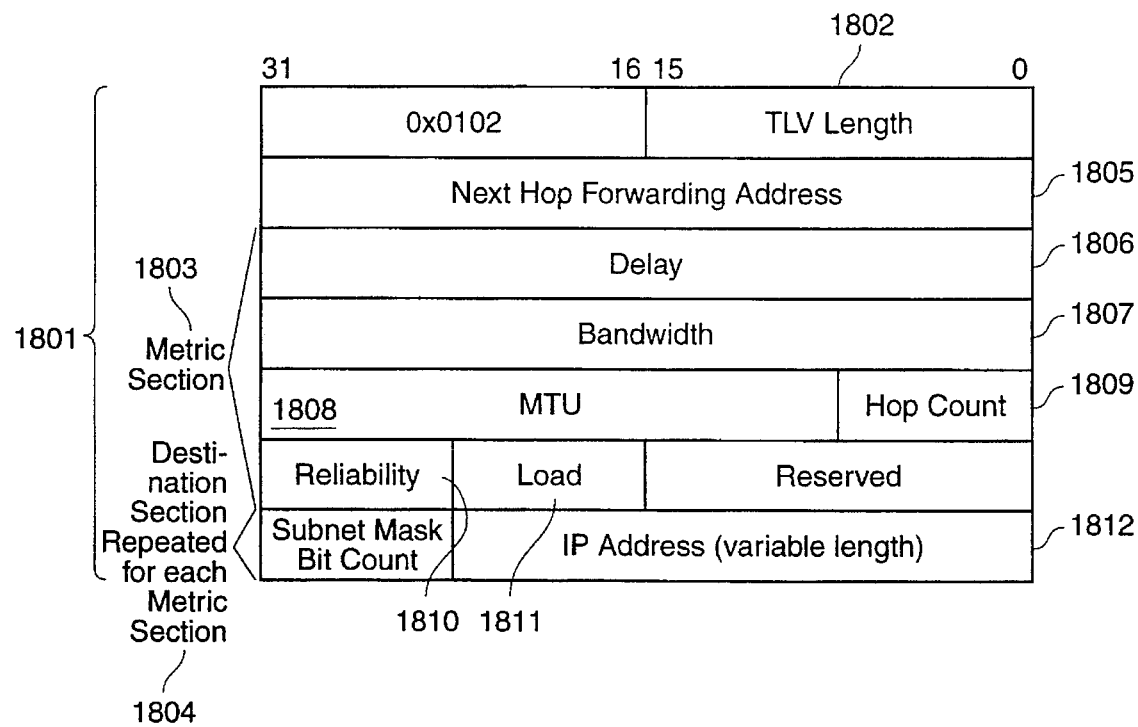
FIG. 18 shows a block diagram of an IP metric type TLV format.

FIG. 18 shows a block diagram of an IP metric type TLV format.

The IP metric type TLV format 1801 may comprise a TLV length 1802, a metric section 1803, and a destination section 1804. The metric section 1803 may comprise values for a next hop forwarding address 1805, a delay value 1806 (possibly a special value indicating an unreachable route), a bandwidth value 1807, a maximum transmission unit (MTU) value 1808, a hop count value 1809, a reliability value 1810 (expressed as an error rate in units of $1/255$), and a load value 1811 (expressed as a fraction of maximum in units of $1/255$). The destination section 1804 may comprise a set of IP addresses 1812. These values are known in the art.

TLV formats for an AppleTalk metric type and a Novell network metric type are similar to the TLV format for the IP metric type.

Figure 19:
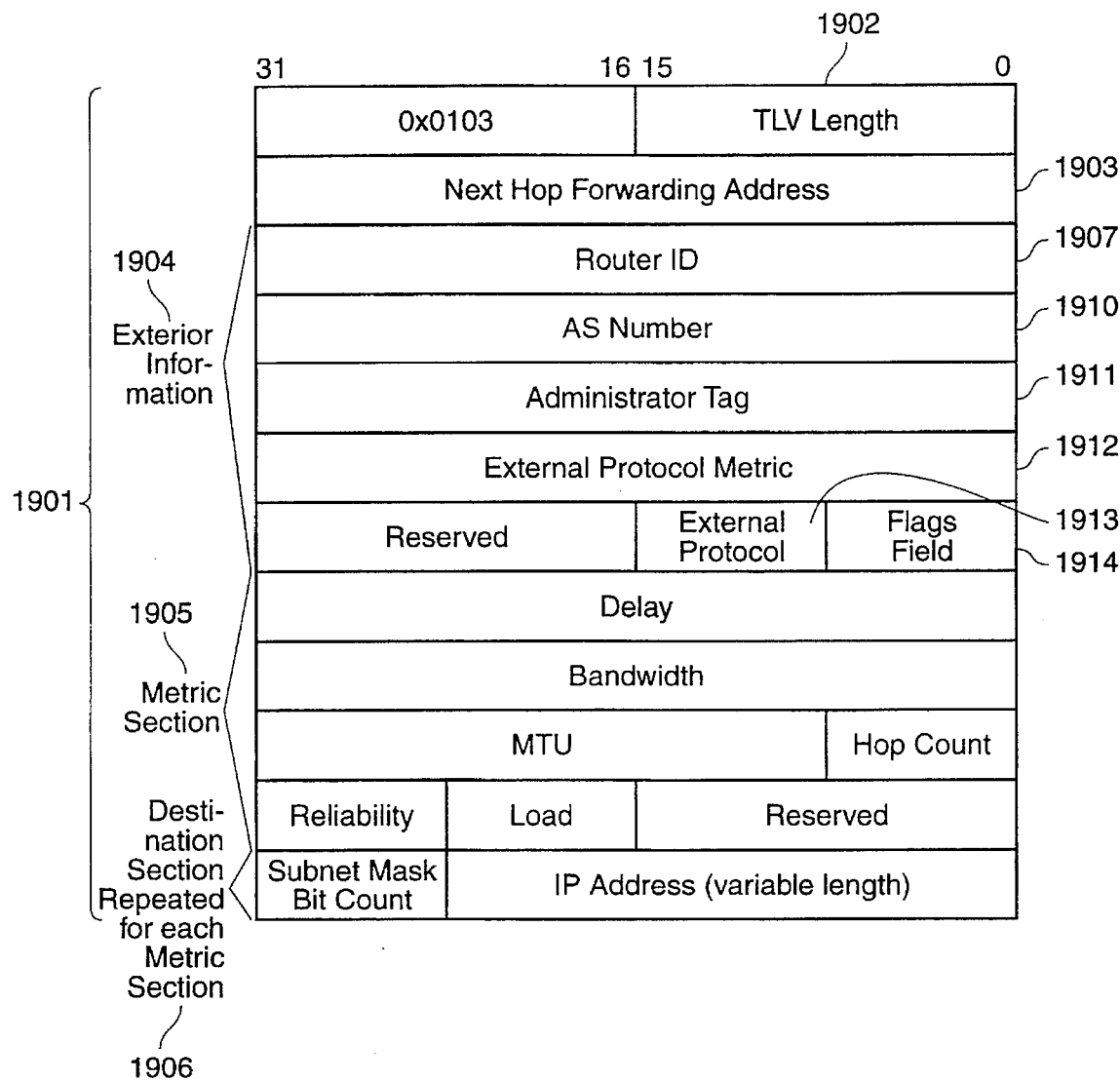
FIG. 19 shows a block diagram of an IP exterior type TLV format.

FIG. 19 shows a block diagram of an IP exterior type TLV format.

The IP exterior type TLV format 1901 may comprise a TLV length 1902, a next hop forwarding address 1903, an exterior section 1904, a metric section 1905 like the metric section 1803, and a destination section 1906 like the destination section 1804.

The exterior section 1904 may comprise a router ID 1907, an AS number 1910 like the AS number 1207, an administrator tag 1911, an external protocol metric value 1912, an external protocol value 1913, and a flags field 1914.

The router ID 1907 may comprise the IP address of the router 105 that redistributed this router 105 into EIGRP.

The administrator tag 1911 may comprise a tag assigned by a network administrator; it is untouched by EIGRP. The tag may be detected by routers 105 at AS borders and used for policy-based routing. For example, the tag may be used to indicate a packet that may not enter a designated AS, that may not exit a designated AS, that must be routed at a particular priority or with a particular reliability or limit to delay, or other policy-based routing considerations.

The external protocol metric value 1912 may comprise a metric value determined by the external protocol. If the external protocol is IGRP1 or EIGRP, the external protocol metric value 1912 will be set to zero and the IGRP1 metric information will be recorded in the metric section 1905.

The external protocol value 1913 may comprise a value specifying the external protocol. These values may comprise the following:

| IGRP1 | 1  | EIGRP | 2 | Static | 3 |
|-------|----|-------|---|--------|---|
| RIP   | 4  | HELLO | 5 | OSPF   | 6 |
| IS-IS | 7  | EGP   | 8 | BGP    | 9 |
| IDRP  | 10 |       |   |        |   |

In a preferred embodiment, the flags field 1914 may comprise an INTERNAL flag (bit 0), set to indicate that the destination is considered to be in the same AS. If so, the AS number 1910 will be set to the AS that the route will be redistributed into.

In a preferred embodiment, the flags field 1914 may comprise a CD flag (bit 1), set to indicate that the destination should be regarded as a candidate for the "default route". In a preferred embodiment, the default route is selected from all advertised candidate routes with the smallest metric. Default routes are known in the art.

TLV formats for an AppleTalk exterior type and a Novell network exterior type are similar to the TLV format for the IP exterior type.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A method of reliably receiving, at a device having a recipient identifier, multicast packets and unicast packets in a network, comprising upon receiving a first packet having a sequence number from a source, transmitting an acknowledgment to said source, said acknowledgment indicating said recipient identifier;

upon receiving a second packet having an indicator representative of a set of destinations for which an acknowledgment was not received, entering a conditional-receive mode if said indicator is not representative of said recipient identifier; and upon receiving a third packet having an indicator representative of conditional receipt, receiving said third packet only when in said conditional-receive mode.

2. A method as in claim 1, further comprising discarding said sequence number of said first packet after transmitting said acknowledgment.

3. A method as in claim 1, further comprising exiting said conditional-receive mode after receiving said third packet.

4. A method of reliably transmitting multicast packets and unicast packets in a network, comprising multicasting a first packet having a sequence number to a plurality of destinations;

recording a set of ones of said plurality of destinations for which an acknowledgment is not received;

when said set is nonempty, multicasting a second packet having an indicator representative of said set;

multicasting a third packet having an indicator representative of conditional receipt, whereby destinations in said set ignore said third multicast packet; and unicasting said first packet and said third packet to each destination in said set.

5. A method as in claim 4, further comprising waiting for an acknowledgment to said first packet from each destination in said set before said step of recording.

6. A method as in claim 4, wherein multicasting said first packet comprises transmitting said first packet to all of said one destinations.

7. A method as in claim 4, wherein multicasting said first packet comprises transmitting said first packet to all of said one destinations simultaneously over a common communication link.

8. A method as in claim 4, wherein said destinations are a set of neighbors to a router in said network.

9. A method as in claim 4, wherein said first packet comprises an update packet or a query packet in a routing protocol, said routing protocol comprising a finite state machine substantially equivalent to the DUAL finite state machine.

10. A method as in claim 4, wherein said indicator comprises a list of said one destinations that are members of said set.

11. A method as in claim 4, wherein said third packet comprises an update packet or a query packet in a routing protocol, said routing protocol comprising a finite state machine substantially equivalent to the DUAL finite state machine.

12. A method as in claim 4, wherein unicasting said first packet to each said one destination in said set comprises transmitting said first packet to each said one destination in said set.

13. A method as in claim 4, wherein unicasting said first packet to each said one destination in said set comprises transmitting said first packet to each said one destination in said set simultaneously over a common communication link.

14. A device for routing packets in a network, comprising means for reliably transmitting multicast packets and unicast packets in a network, said means for reliably transmitting comprising (a) means for multicasting a first packet having a sequence number to a plurality of destinations, (b) means for recording a set of ones of said plurality of destinations for which an acknowledgment is not received, (c) means, when said set is nonempty, for multicasting a second packet having an indicator representative of said set, (d) means for multicasting a third packet having an indicator representative of conditional receipt, whereby destinations in said set ignore said third packet, and (e) means for unicasting said first packet and said third packet to each destination in said set; and means for reliably receiving multicast packets and unicast packets in a network, said means for reliably receiving comprising (a) a recipient identifier, (b) means, upon receiving a packet having a sequence number from a source, for transmitting an acknowledgment to said source, said acknowledgment indicating said recipient identifier, (c) means, upon receiving a packet having an indicator representative of a set of destinations for which an acknowledgment was not received, for entering a conditional-receive mode if said indicator is not representative of said recipient identifier, and (d) means, for receiving a packet having an indicator representative of conditional receipt only when in said conditional-receive mode.

15. A device as in claim 14, wherein said destinations are a set of neighbors to a router in said network.

16. A device as in claim 14, wherein said first packet comprises an update packet or a query packet in a routing protocol, said routing protocol comprising a finite state machine substantially equivalent to the DUAL finite state machine.

17. A device as in claim 14, wherein said indicator comprises a list of said one destinations that are members of said set.

18. A device as in claim 14, wherein said means for multicasting said first packet comprises means for transmitting said first packet to all of said one destinations.

19. A device as in claim 14, wherein said means for multicasting said first packet comprises means for transmitting said first packet to all of said one destinations simultaneously over a common communication link.

20. A device as in claim 14, wherein said means for reliably receiving comprises means for discarding said sequence number of said fourth packet after transmitting said acknowledgment.

21. A device as in claim 14, wherein said means for reliably receiving comprises means for exiting said conditional-receive mode after receiving said packet having an indicator representative of conditional receipt.

22. A device as in claim 14, wherein said means for reliably transmitting comprises means for waiting for an acknowledgment to said first packet from each said one destination before activating said means for recording.

23. A device as in claim 14, wherein said means for unicasting said first packet to each said one destination in said set comprises means for transmitting said first packet to each said one destination in said set.

24. A device as in claim 14, wherein said means for unicasting said first packet to each said one destination in said set comprises means for transmitting said first packet to each said one destination in said set simultaneously over a common communication link.

25. A device as in claim 14, wherein said third packet comprises an update packet or a query packet in a routing protocol, said routing protocol comprising a finite state machine substantially equivalent to the DUAL finite state machine.

26. A method of routing packets in a network, comprising
receiving a packet, said packet comprising an external header, said external header comprising a value representative of an external routing protocol, a metric assigned by said external routing protocol, a value representative of an autonomous system of routers, and a value representative of an administrative tag;
routing said packet in response to said metric assigned by said external routing protocol; and
routing said packet in response to an administrative policy indicated by said administrative tag.

27. A method as in claim 26, wherein said administrative policy is a security policy, a financial policy, a reliability policy, or a network lag policy.

28. A method as in claim 27, wherein said administrative policy is an application-specific policy.

29. Apparatus for reliably receiving multicast packets and unicast packets in a network, said apparatus comprising
a recipient identifier;
means for transmitting an acknowledgment to a source, said acknowledgment indicating said recipient identifier, upon receiving a packet having a sequence number from said source;
means for entering a conditional-receive mode upon receiving a second packet having an indicator representative of a set of destinations for which an acknowledgment was not received, if said indicator is not representative of said recipient identifier; and
means for receiving a packet having an indicator representative of conditional receipt only when in said conditional-receive mode.

30. Apparatus as in claim 29, further comprising means for discarding said sequence number after transmitting said acknowledgment.

31. Apparatus as in claim 29, further comprising means for exiting said conditional-receive mode after receiving said packet having an indicator representative of conditional receipt.

32. Apparatus for reliably transmitting multicast packets and unicast packets in a network, said apparatus comprising
means for multicasting a first packet having a sequence number to a plurality of destinations;
means for recording a set of ones of said plurality of destinations for which an acknowledgment is not received;
means responsive to said set for multicasting a second packet having an indicator representative of said set;
means for multicasting a third packet having an indicator directing destinations in said set to ignore said third multicast packet; and
means for unicasting said first packet and said third packet to each destination in said set.

33. Apparatus as in claim 32, further comprising means for waiting for an acknowledgment to said first packet from each destination in said set, and for delaying said means for recording while waiting.

34. Apparatus as in claim 32, wherein said means for multicasting said first packet is coupled to all of said one destinations simultaneously with a common communication link.

35. Apparatus as in claim 32, wherein said first packet comprises an update packet or a query packet in a routing protocol, said routing protocol comprising a finite state machine substantially equivalent to the DUAL finite state machine.

36. Apparatus as in claim 32, wherein said indicator comprises a list of said one destinations that are members of said set.

37. Apparatus as in claim 32, wherein said third packet comprises an update packet or a query packet in a routing protocol, said routing protocol comprising a finite state machine substantially equivalent to the DUAL finite state machine.

38. Apparatus as in claim 32, wherein said means for unicasting said first packet is coupled to each said one destination in said set simultaneously with a common communication link.

39. Apparatus for routing packets in a network, said apparatus comprising
means for receiving a packet, said packet comprising an external header, said external header comprising a value representative of an external routing protocol, a metric assigned by said external routing protocol, a value representative of an autonomous system of routers, and a value representative of an administrative tag;
means for routing said packet in response to said metric assigned by said external routing protocol; and
means for routing said packet in response to an administrative policy indicated by said administrative tag.

40. Apparatus as in claim 39, wherein said administrative policy is a security policy, a financial policy, a reliability policy, or a network lag policy.

41. Apparatus as in claim 39, wherein said administrative policy is an application-specific policy.

* * * * *

UNITED STATES PATENT AND TRADEMARK OFFICE
CERTIFICATE OF CORRECTION

PATENT NO. : 5,519,704
DATED : May 21, 1996
INVENTOR(S) : Dino Farinacci; Robert Albrightson It is certified that error appears in the above-indentified patent and that said Letters Patent is hereby corrected as shown below:

Column 2, line 3, replace "simply" with --simplify--.

Column 7, line 25, delete "are".

Signed and Sealed this

Fourteenth Day of January, 1997

Attest:

BRUCE LEHMAN

Attesting Officer

Commissioner of Patents and Trademarks